N. L. OBRECHT.
METHOD OF FORMING BEARINGS.
APPLICATION FILED AUG. 30, 1913.
1,129,116. Patented Feb. 23, 1915.
2 SHEETS—SHEET 1.
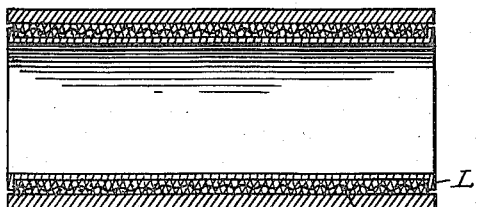
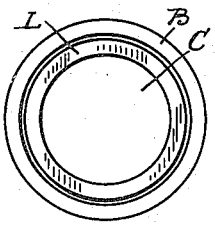
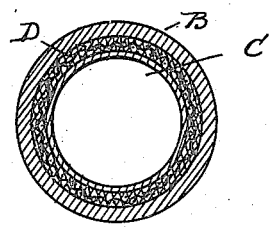
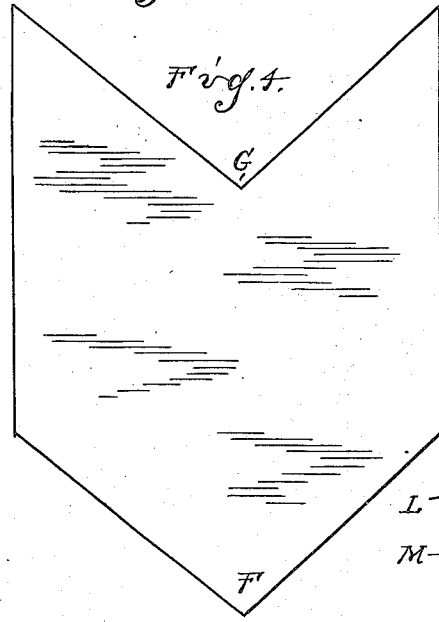
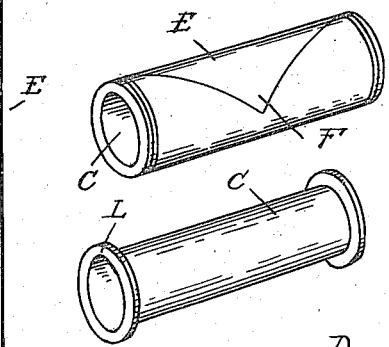
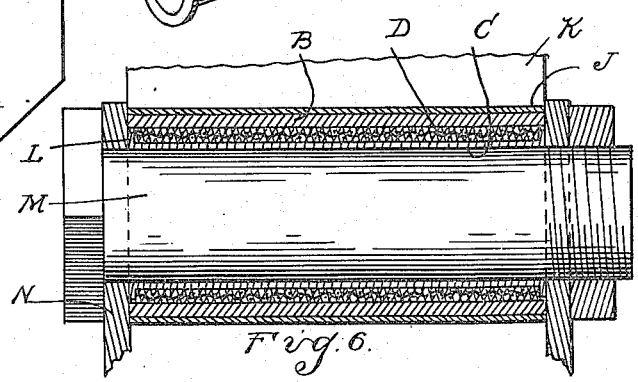
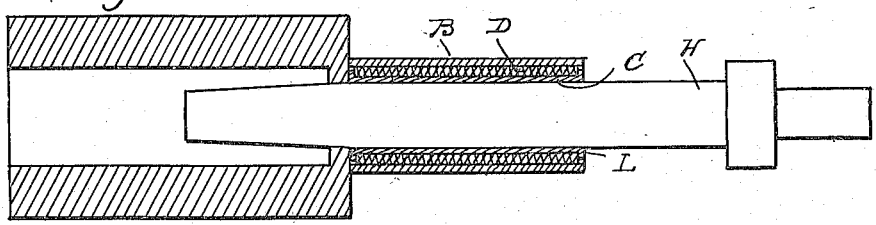
Inventor
Norbert L. Obrecht

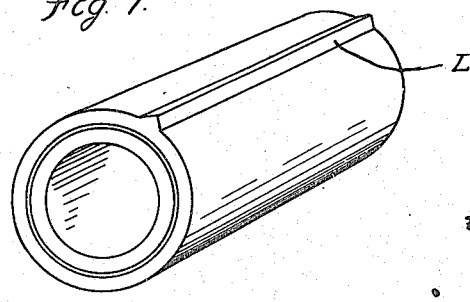
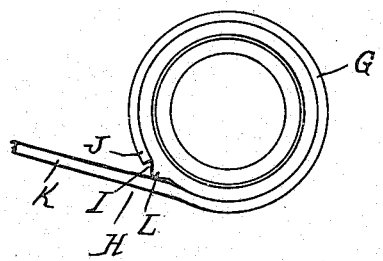
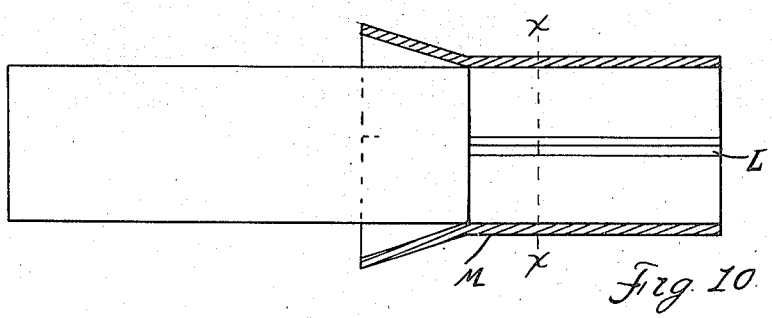
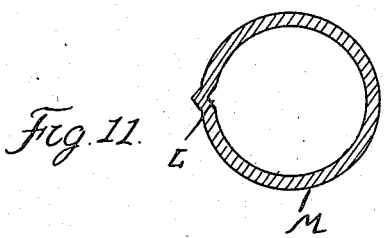

UNITED STATES PATENT OFFICE.

NORBERT L. OBRECHT, OF DETROIT, MICHIGAN, ASSIGNOR, BY DIRECT AND MESNE ASSIGNMENTS, TO O. AND S. BEARING COMPANY, OF DETROIT, MICHIGAN, A PARTNERSHIP COMPOSED OF HARRY SKILLMAN, NORBERT L. OBRECHT, AND NEWTON SKILLMAN.

METHOD OF FORMING BEARINGS.

1,129,116.   Specification of Letters Patent.   Patented Feb. 23, 1915.

Application filed August 30, 1913. Serial No. 787,499.

*To all whom it may concern:*

Be it known that I, NORBERT L. OBRECHT, a citizen of the United States of America, residing at Detroit, in the county of Wayne and State of Michigan, have invented certain new and useful Improvements in Methods of Forming Bearings, of which the following is a specification, reference being had therein to the accompanying drawings.

My invention relates to a method of forming bearings and resides in the novel steps in the making of the bearing, as will more fully hereinafter appear.

In the drawings,—Figure 1 is a longitudinal central section illustrating one form of bearing made by my improved method; Fig. 2 is an end elevation thereof; Fig. 3 is a cross-section; Fig. 4 is a plan view of a strip of lubricating fabric from which the bushing is made; Figs. 5, 6 and 7 illustrate certain steps in the formation of the bearing; Fig. 8 is a perspective view of one of the bearing parts.

The bearing formed by my improved method comprises two sections B and C positioned one within the other for relative movement, and a lubricating bushing D of compressible material arranged intermediate the sections and compressed therebetween. In forming the bearing the bushing is arranged upon one of the sections and the inner section C then positioned within the outer, the bushing D being compressed during the forming of the bearing, so that when the parts are assembled in operative relation, the bushing is compressed intermediate the relatively movable sections. Preferably the bushing is made from a strip E of asbestos having interwoven therein a sufficient quantity of fine wire to better maintain the shape of the fabric, the asbestos being impregnated with a solid lubricant. The asbestos is preferably impregnated by placing the same in a mixture of oil, tallow and finely powdered graphite having about the proportions of two of graphite, one of oil and one of tallow, the mixture being maintained at a temperature of about 300 degrees F. so as to increase the liquidity of the oil and tallow, to permit the same to carry the graphite thoroughly between the fibers of the asbestos. The length of time which the asbestos remains in the mixture depends of course, upon the thickness of the fibrous substance employed. After the asbestos strip has been properly treated it is cut into lengths equal to the circumference of the inner member. One end of the strip as F is preferably tapered and the other end provided with a coöperating recess G, as shown in Fig. 4, so as to provide a better joint between the meeting ends of the fabric.

In one manner of forming the bearing the strip is wrapped around the inner member and sufficiently compressed thereabout so that it will remain in engagement with the inner member during the telescoping of the sections. After the parts are so assembled they are placed in a suitable machine and the outer member contracted or the inner expanded by suitable dies. During the latter operation the fibrous material is compressed so that it is exceedingly hard. In Figs. 1 to 3 inclusive and 4 to 8 inclusive of the drawing the inner member is illustrated as formed of a sleeve, and in Fig. 7 is shown a tapering mandrel H which is employed for expanding the inner sleeve by driving the mandrel therethrough. The amount of pressure placed upon the bushing varies according to the use to which the bearing is to be put, but in the type of bearing illustrated in the first eight figures, which is designed for the eye J of a spring K, a pressure of about 10,000 pounds is employed to force the mandrel through the inner sleeve. During this compression the carrying agent is substantially, if not entirely driven out of the fabric through the opening at the ends of the sleeves. Thus as will be seen, the inner member is provided at opposite ends with flanges L which serve as retainers for the bushing. These flanges however, when the bearing is complete, are spaced a slight distance from the outer sleeve, as illustrated in Fig. 2. One of the sections, preferably the inner, has the face in engagement with the bushing, smooth or polished, so as to permit this section to freely turn in the bushing. Both bushings are preferably formed of metal. With the construction shown in Fig. 6 the outer metallic sleeve has a driving fit with the eye J of the spring K, while the inner member is fixedly secured against rotation to the bolt M which connects the bearing and the tackle N. The bolt M is preferably engaged with the inner sleeve after the members B, C and D are assembled, and this engagement may be effected by driving the bolt longitudinally through the inner sleeve, the bolt being provided with a roughened surface or otherwise suitably constructed to prevent relative rotation between the same and the inner sleeve.

If desired, the bushing may be compressed within the outer sleeve and then during the assembling of the inner member within the outer, only a further slight compression of the bushing effected. In each case however, the parts of the bearing are so arranged that an expansible, radial pressure is placed upon the inner member by the bushing, and this pressure is substantially equal throughout all portions of the inner member in engagement with the bushing.

When the bearing hereinbefore described is employed for the eye G of a vehicle spring H it is desirable to secure the sleeve B to the spring eye against relative rotation. I have devised a novel way of accomplishing this result. Thus in the springs now in general use on vehicles, particularly motor vehicles, there is a slight space I between the end J of the eye G and the flat body portion K of the spring. I therefore, form upon the outer member B a projection L that is of a size to be arranged within the space I. Preferably the anchor or projection is in the form of an elongated rib, as shown in Fig. 9. When the outer member B is contracted I preferably employ a hollow mandrel M which has extending longitudinally thereof a suitable groove N for forming the rib L (see Figs. 10 and 11), and when the bearing is forced through the hollow mandrel, not only will the outer sleeve be contracted, but furthermore, the rib L will be formed. Before forcing the bearing through the hollow mandrel the parts are assembled as hereinbefore described, with the result that the bearing as it leaves the mandrel M is in finished form.

What I claim as my invention is:—

1. The method of making bearings, comprising arranging compressible, lubricating material intermediate two telescoping, relatively movable members, and radially compressing said material to form a permanent bushing intermediate said members by decreasing the distance between the telescoping members.

2. The method of making bearings, comprising arranging compressible, lubricating material between two relatively movable, telescoping, metallic members and radially compressing said material to form a bushing permanently arranged therebetween, by drawing the metal of one of said members to decrease the difference in cross-section between said members.

3. The method of making bearings, comprising arranging compressible, lubricating material between relatively movable sections, and radially compressing said lubricating material while intermediate the sections to form a bushing therefor.

4. The method of making bearings, comprising arranging compressible, lubricating material between inner and outer relatively movable sections and radially compressing the lubricating material while intermediate the sections to form a bushing therefor, by decreasing the distance between the inner and outer sections.

5. The method of making bearings, comprising arranging compressible, lubricating material upon one section of the bearing and engaging said section with the lubricating material thereon with another section, to form inner and outer members with the lubricating material therebetween, and in changing the cross-sectional area of one member by decreasing the distance between the inner and outer sections, whereby the lubricating material is radially compressed.

6. The method of making bearings, comprising arranging compressible, expansible, lubricating material intermediate inner and outer relatively-movable members, and radially compressing said material to form a bushing intermediate said members by decreasing the radial distance between the inner and outer members.

7. The method of making bearings, comprising arranging compressible, expansible, lubricating material intermediate inner and outer relatively movable members and radially compressing said material to form a bushing intermediate said members by decreasing the radial distance between the inner and outer members, and in forming during the decreasing of the radial distance an anchor upon the outer member.

8. The method of making bearings, comprising arranging compressible, expansible, lubricating material intermediate inner and outer relatively movable members, and contracting the outer member to radially compress the material intermediate the members and form a bushing, and in forming an anchor upon the outer member during the contraction thereof.

9. The method of making bearings, composed of telescoping members having compressed expansible lubricating material arranged therebetween, comprising radially compressing the lubricating material between the telescoping members during the assembling of the telescoping members in proper relation to each other.

In testimony whereof I affix my signature in presence of two witnesses.

NORBERT L. OBRECHT.

Witnesses:
WM. J. BELKNAP,
JAMES P. BARRY.